(12) United States Patent
Kinstler

(10) Patent No.: US 8,575,580 B1
(45) Date of Patent: Nov. 5, 2013

(54) RADIATION SHIELD DEVICE AND ASSOCIATED METHOD

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/966,315

(22) Filed: Dec. 13, 2010

(51) Int. Cl.
*B64G 1/54* (2006.01)

(52) U.S. Cl.
CPC .......................................... *B64G 1/54* (2013.01)
USPC ..................................... 250/517.1; 250/515.1

(58) Field of Classification Search
USPC ............................ 250/515.1, 517.1; 244/171.7
See application file for complete search history.

(56) References Cited

U.S. PATENT DOCUMENTS

| | | | |
|---|---|---|---|
| 4,058,945 A * | 11/1977 | Knapp | 52/244 |
| 4,291,541 A | 9/1981 | Kneip et al. | |
| 5,012,217 A * | 4/1991 | Palkovich et al. | 335/301 |
| 5,317,879 A | 6/1994 | Goldberg et al. | |
| 5,379,600 A | 1/1995 | Moritsu et al. | |
| 7,464,901 B2 | 12/2008 | Kinstler | |
| 7,484,691 B2 * | 2/2009 | Kinstler | 244/171.7 |
| 7,990,662 B2 | 8/2011 | Berkley et al. | |
| 8,054,077 B2 | 11/2011 | Hsieh et al. | |
| 2006/0169931 A1 | 8/2006 | Kinstler | |
| 2008/0307801 A1 | 12/2008 | Tanaka et al. | |
| 2009/0038318 A1 | 2/2009 | Begg et al. | |
| 2010/0323900 A1 | 12/2010 | Kawashima | |

OTHER PUBLICATIONS

Hoffman, J., et al.; "Use of Superconducting Magnet Technology for Astronaut Radiation Protection"; dated May 5, 2005 at the MIT-NASA Radiation Shielding Workshop, Cambridge, MA; 38 pages.
Hoffman, J., et al.; "Use of Superconducting Magnet Technology for Astronaut Radiation Protection"; NIAC Phase I Fellows Meeting; Atlanta, Georgia; Mar. 15-16, 2005.
Technovelgy.com; "Superconducting Magnetic Bubble to Protect Astronauts from Radiation"; downloaded from http://www.technovelgy.com/ct/Science-Fiction/News.asp?NewsNum=289 on Nov. 2, 2010; 3 pages.
Augustynowicz, S.D., et al.; "Cryogenic Insulation System for Soft Vacuum"; 1999; 8 pages.

* cited by examiner

*Primary Examiner* — Jack Berman
*Assistant Examiner* — Eliza Osenbaugh-Stewart
(74) *Attorney, Agent, or Firm* — Alston & Bird LLP

(57) ABSTRACT

A method and device of shielding an area from radiation are provided. A radiation shield device may include first and second shells at least partially surrounding the area with the second shell being spaced apart from and further away from the area than the first shell. Both the first and second shells include a plurality of coils that are arranged in paired coil groupings and that encircle the area to be shielded from radiation. The coil groupings of the first shell may be configured to support current flow in an opposite direction to that in which the paired coil groupings of the second shell are configured to support current flow. As such, each coil grouping of the first shell has north and south poles that are correspondingly oppositely positioned from the north and south poles of the paired coil grouping of the second shell.

21 Claims, 6 Drawing Sheets

RADIATION SHIELD DEVICE AND ASSOCIATED METHOD

TECHNOLOGICAL FIELD

Embodiments of the present disclosure relate generally to methods and devices for shielding an area from radiation and, more particularly, to an active radiation shield device and an associated method.

BACKGROUND

The sun occasionally releases significant amounts of charged particles during events known as coronal mass ejectas ("CMEs"). The charged particles released during CMEs include electrons, protons, and heavy ions. Each CME may last for about one or two days in the vicinity of earth, but their effects may linger for up to a week. Such proton and heavy ion radiation can cause cell damage to humans exposed to such radiation. Additionally, sensitive electronic components and other devices may be adversely affected by such radiation. Therefore, even though CMEs are relatively uncommon occurrences, the amounts of radiation they could potentially inflict upon a crew and equipment of a spacecraft suggests that consideration be given to shielding part or all of a spacecraft from such radiation. Similarly, comparable radiation protection may be desirable in other environments as well, such as habitats for celestial bodies such as the moon and Mars.

Shielding from proton and heavy ion radiation may generally be accomplished by either absorbing the particles or by deflecting the particles. To absorb the radiation, materials of a thickness sufficient for the amount of energy expected from the radiation, can be provided around an area that houses the crew and/or sensitive equipment during a CME. However, because of the significant amount of weight such a housing would require, the use of radiation absorbing material is not practical for space exploration and other applications. Additionally, the absorption of high energy particles may release a different form of radiation such as gamma rays and X-rays that pass through the shielding material and create other difficulties for the crew and/or equipment.

It may therefore be preferable to deflect the particles of radiation rather than absorb them. Because of the need to minimize the weight and energy consumption of spacecrafts, systems for deflecting the radiation, for even a relatively brief period of time, such as a day or two, have not been practical based upon the amount of material and/or energy required for such systems.

BRIEF SUMMARY

A method and device of shielding an area from radiation, such as the charged particles released during CMEs, are provided according to embodiments of the present disclosure. In this regard, the radiation shield device and associated method of one embodiment are configured to deflect the particles of radiation in a manner that is lighter and/or consumes less energy than some prior approaches.

In one embodiment, a radiation shield device is provided that includes a first shell at least partially surrounding an area to be shielded from radiation. The first shell includes a plurality of coils that encircle the area to be shielded from radiation. The radiation shield device of this embodiment also includes a second shell at least partially surrounding the area to be shielded from radiation and spaced apart from and further away from the area to be shielded than the first shell. The second shell also includes a plurality of coils that encircle the area to be shielded from radiation and the first shell. In this embodiment, the coils of the first shell are arranged in coil groupings and paired with coil groupings of the second shell. The coil groupings of the first shell may also be configured to support current flow in an opposite direction to that in which the paired coil groupings of the second shell are configured to support current flow. As such, each coil grouping of the first shell has north and south poles that are correspondingly oppositely positioned from the north and south poles of the paired coil grouping of the second shell. The radiation shield device of this embodiment can therefore effectively deflect charged particles while limiting the magnetic field generated within the area that is to be shielded from radiation.

The radiation shield device of one embodiment also includes a truss network between the first and second shells for positioning the second shell relative to the first shell. The first and second shells may be configured with ampere-turns that result in nominally equal but opposing magnetic field strengths. In one embodiment, the plurality of coils of the first and second shells may be configured such that a ratio of magnetic field strength between the first and second shells to magnetic field strength within the area to be shielded from radiation is at least 10:1. The plurality of coils of the first and second shells of one embodiment are formed of a superconductive material. In this embodiment, the radiation shield device may also include a thermal control system configured to control a temperature of the superconductive material that comprises the plurality of coils of the first and second shells. The first and second shells of one embodiment each have a medial cylindrical portion and opposed end portions that taper radially inward from the medial cylindrical portion.

In another embodiment, a radiation shield device is provided that includes a first shell at least partially surrounding an area to be shielded from radiation. The first shell includes a plurality of coils that encircle the area to be shielded from radiation. The radiation shield device of this embodiment also includes a second shell at least partially surrounding the area to be shielded from radiation and spaced apart from and further away from the area to be shielded than the first shell. The second shell also includes a plurality of coils that encircle the area to be shielded from radiation and the first shell. The coils of the first and second shells of this embodiment are configured such that a ratio of magnetic field strength between the first and second shells to magnetic field strength within the area to be shielded is at least 10:1.

The radiation shield device of one embodiment also includes a truss network between the first and second shells for positioning the second shell relative to the first shell. The first and second shells may be configured with ampere turns that result in nominally equal but opposing magnetic field strengths. In one embodiment, the plurality of coils of the first shell may be arranged in coil groupings and paired with coil groupings of the second shell. The coil groupings of the first shell of this embodiment are configured to support current flow in an opposite direction to that in which the paired coil groupings of the second shell are configured to support current flow such that each coil grouping of the first shell has north and south poles that are correspondingly oppositely positioned from the north and south poles of the paired coil grouping of the second shell. The plurality of coils of the first and second shells of one embodiment are formed of a superconductive material. In this embodiment, the radiation shield device may also include a thermal control system configured to control a temperature of the superconductive material that comprises the plurality of coils of the first and second shells. The first and second shells of one embodiment each have a medial cylindrical portion and opposed end portions that taper radially inward from the medial cylindrical portion.

In a further embodiment, a method is provided for shielding an area from radiation. The method of this embodiment includes providing current flow through a plurality of coils of a first shell that at least partially surrounds the area to be shielded from radiation. The method further includes providing current flow through a plurality of coils of a second shell that at least partially surrounds the area to be shielded from radiation and that is spaced apart from and further away from the area to be shielded than the first shell. The coils of the first shell may be arranged in coil groupings and paired with coil groupings of the second shell. In this embodiment, the provision of current flow through the coil groupings of the first shell includes providing the current flow in an opposite direction to that in which the current flows through the paired coil groupings of the second shell. As such, each coil grouping of the first shell of this embodiment has north and south poles that are correspondingly oppositely positioned from the north and south poles of the paired coil grouping of the second shell.

The method of one embodiment also includes providing a truss network between the first and second shells for positioning the second shell relative to the first shell. In one embodiment, the provision of current flow through the plurality of coils of the first and second shells includes configuring the first and second shells with ampere-turns that result in nominally equal but opposing magnetic field strengths. The method of one embodiment also includes generating a magnetic field as a result of providing the current flow through the plurality of coils of the first and second shells such that a ratio of magnetic field strength between the first and second shells to magnetic field strength within the area to be shielded from radiation is at least 10:1. In an embodiment in which the pluralities of coils of the first and second shells are formed of a superconductive material, the method may also include controlling a temperature of the superconductive material that forms the plurality of coils of the first and second shells. The method of one embodiment may also provide the first and second shells that each have a medial cylindrical portion and opposed end portions that taper radially inward from the medial cylindrical portion.

In accordance with embodiments of the present disclosure, a radiation shield device and an associated method are provided in order to deflect the particles of radiation in a manner that is conservative in terms of its weight and its energy consumption. However, the features, functions and advantages that have been discussed may be achieved independently and the various embodiments of the present disclosure may be combined in the other embodiments, further details of which may be seen with reference to the detailed description and drawings.

BRIEF DESCRIPTION OF THE DRAWINGS

Figure 1:
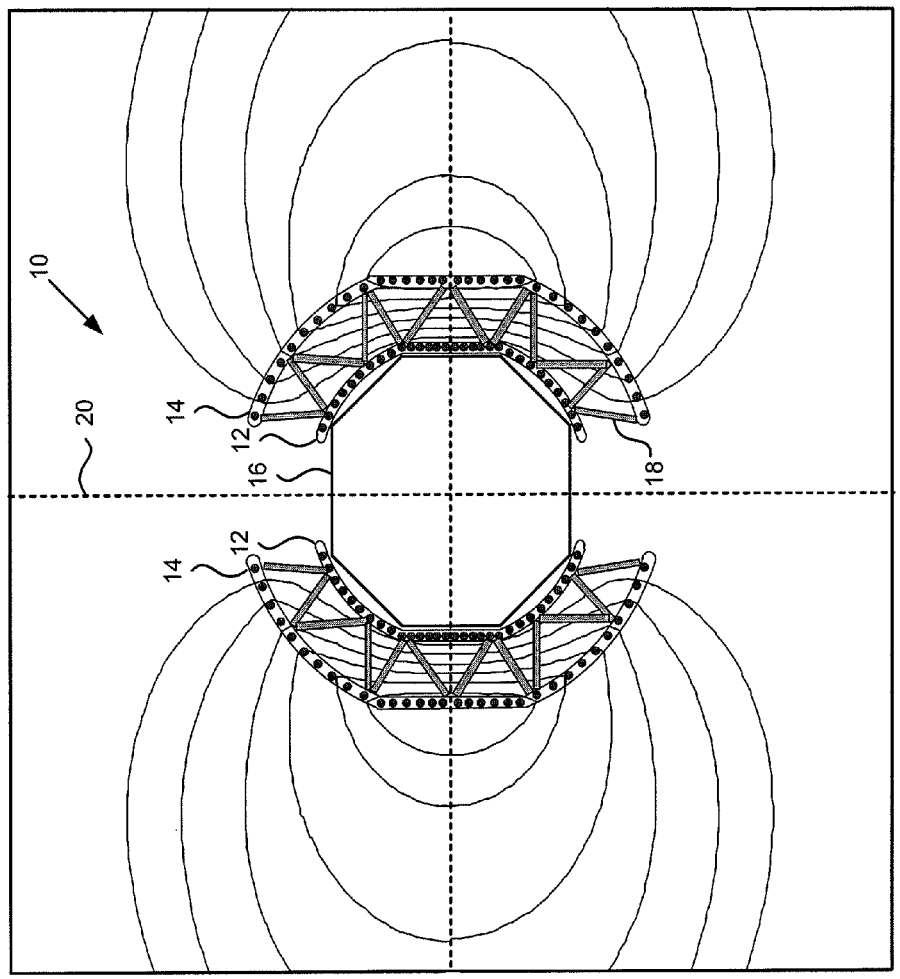
Figure 2:
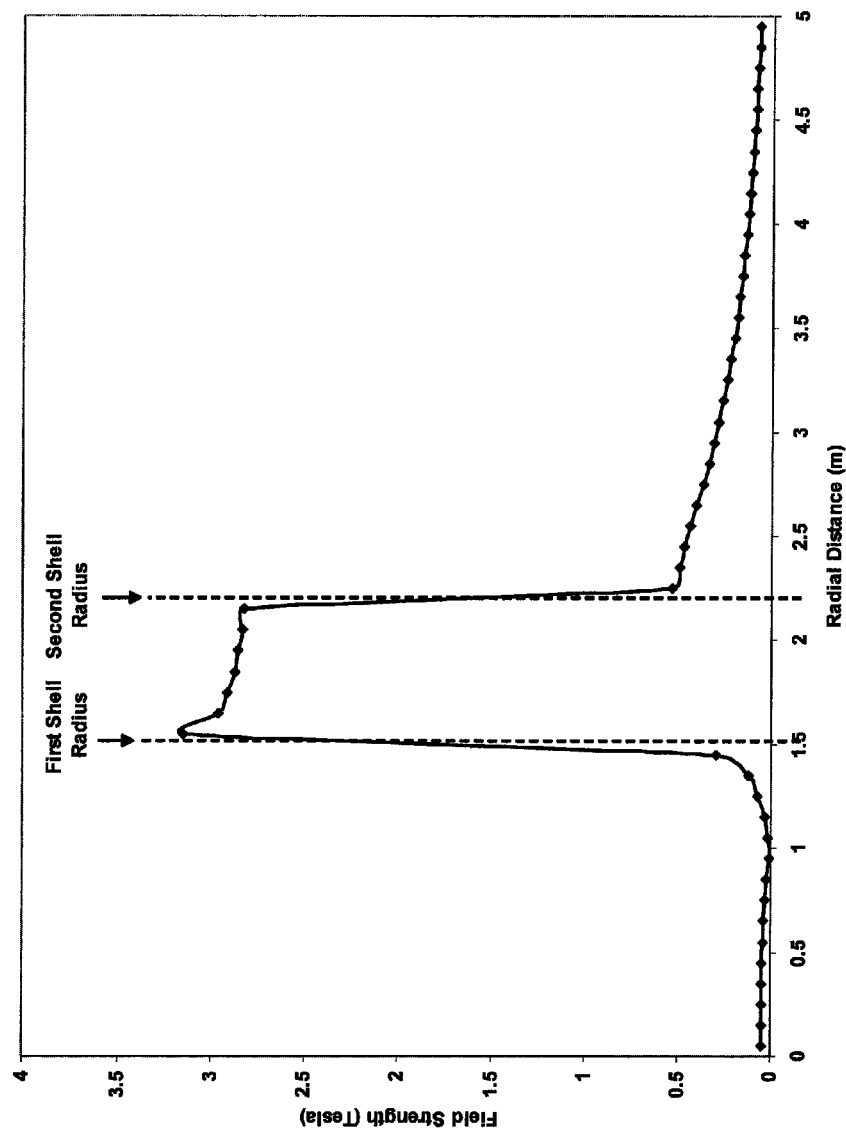
Figure 3:
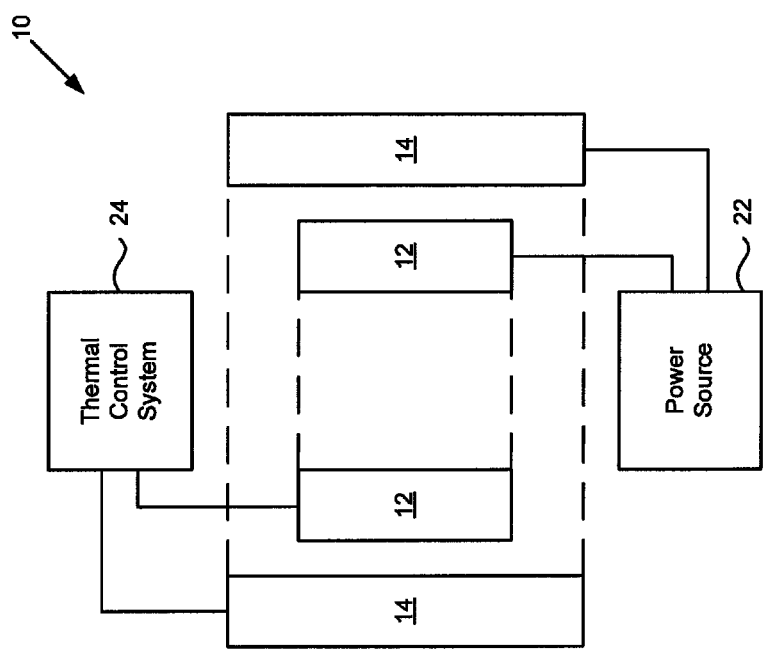
Figure 4:
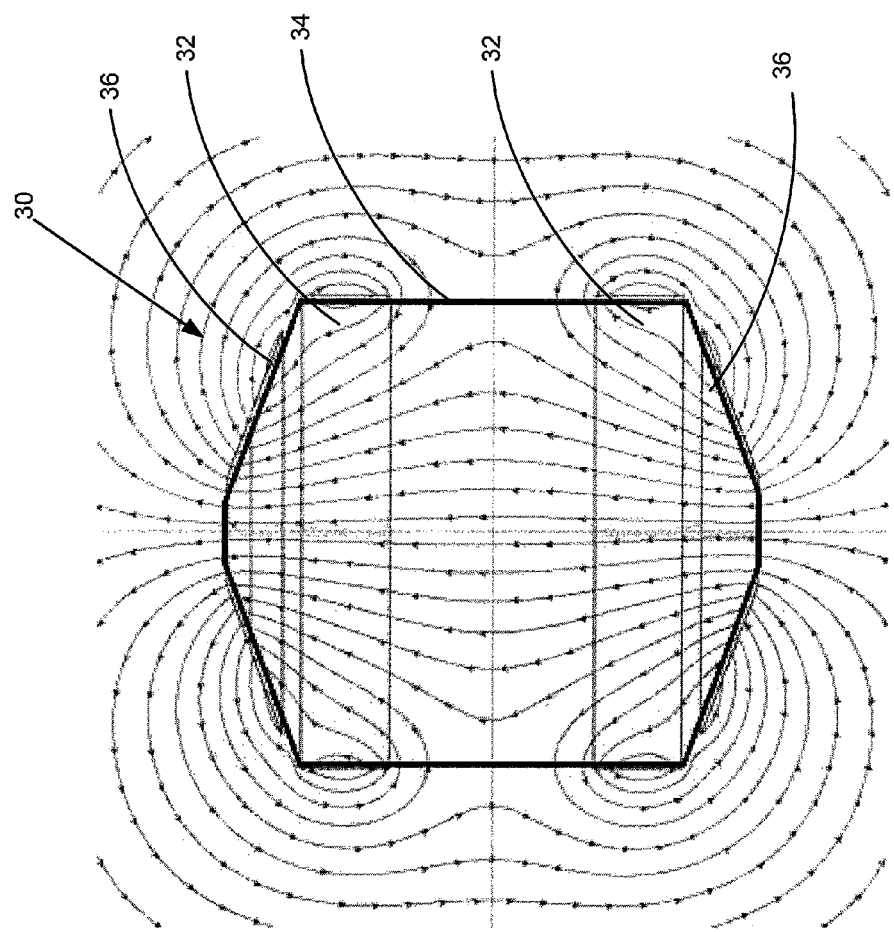
Figure 5:
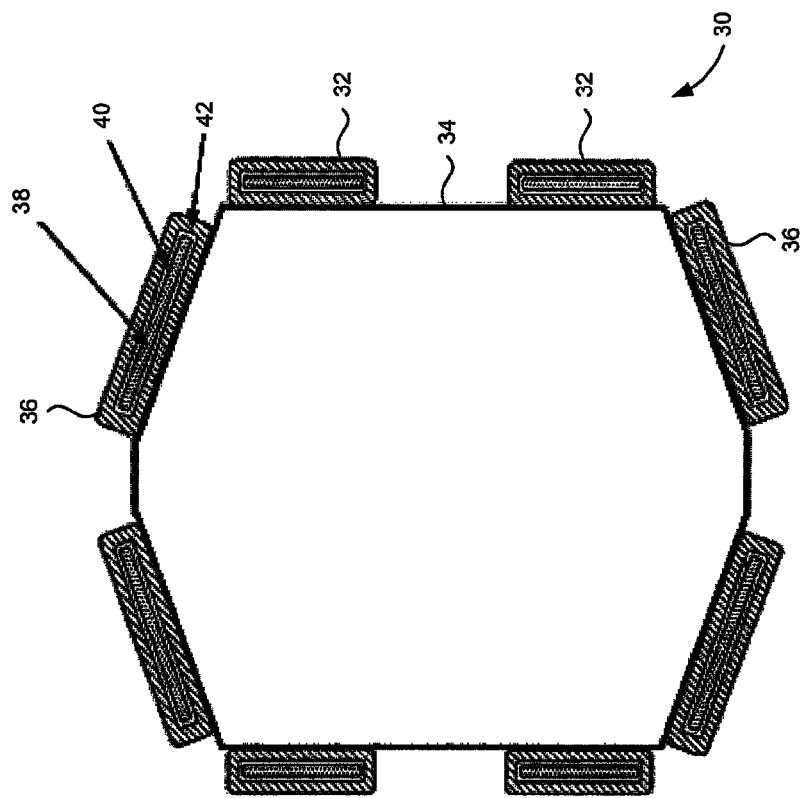
Figure 6:
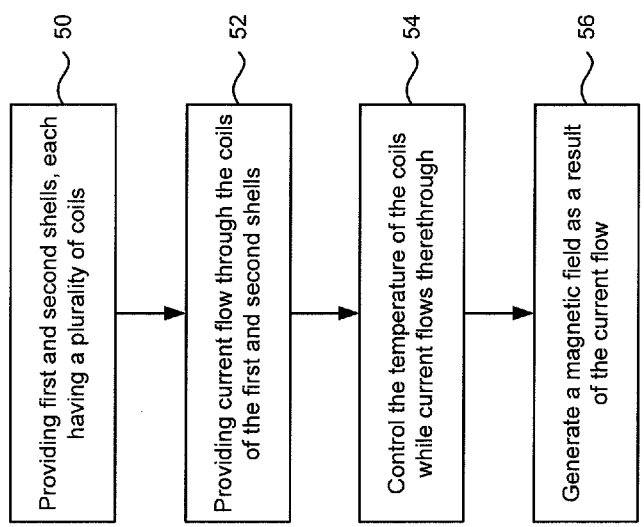

Having thus described embodiments of the disclosure in general terms, reference will now be made to the accompanying drawings, which are not necessarily drawn to scale, and wherein:

FIG. 1 is a cross-sectional view of the first and second shells of a radiation shield device in accordance with one embodiment of the present disclosure in which the coil groupings are arranged in offset parallel annular rings about the central axis and in which the magnetic flux lines generated by the first and second shells are illustrated;

FIG. 2 is a graphical representation of the magnetic flux density generated by the first and second shells of FIG. 1 as a function of radial distance from the central axis of the area to be shielded;

FIG. 3 is a block diagram of a radiation shield device in accordance with one embodiment of the present disclosure;

FIG. 4 is a plan view of a radiation shield device in accordance with another embodiment of the present disclosure in which the resulting magnetic flux lines are illustrated;

FIG. 5 is a cross-sectional view of the radiation shield device of FIG. 4 illustrating, among other components, aspects of the thermal control system; and FIG. 6 is a block diagram of the operations performed in accordance with a method of shielding an area from radiation in accordance with one embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, the radiation shield device 10 in accordance with one embodiment of the present disclosure is illustrated. The radiation shield device 10 is generally described herein as providing protection from radiation for a manned space vehicle or a habitat for celestial bodies, particularly during CME events. However, further embodiments of the present disclosure may include radiation shield devices for any situation in which protection from particle radiation is desired beyond the earth's magnetosphere.

The radiation shield device 10 includes first and second shells 12, 14 that at least partially surround an area 16 to be shielded from radiation. In the illustrated embodiment, a space vehicle defines the area to be shielded from radiation. A space vehicle may have various configurations, but the space vehicle of the illustrated embodiment has a cylindrical center portion and tapered end portions. A space vehicle may house one or more crew members as well as equipment, such as electronics, that may be sensitive to particle radiation. As shown in the illustrated embodiment, the first and second shells 12, 14 at least partially surround the space vehicle. As such, the first and second shells may somewhat follow the shape of the space vehicle. In this regard, the first and second shells 12, 14 of the illustrated embodiment have a medial cylindrical portion that encircles the cylindrical central portion of the space vehicle and opposed end portions are tapered radially inward from the medial cylindrical portion so as to generally follow the tapered end portions of the space vehicle. The tapered end portions of the first and second shells 12, 14 may taper in a curved fashion as shown in the embodiment of FIG. 1. Alternatively, the end portions of the first and second shells 12, 14 may taper linearly or otherwise so as to more closely follow the tapered end portions of the space vehicle.

As shown in FIG. 1, the second shell 14 is spaced apart from the first shell 12 in such a manner that the second shell is further away from the area 16 to be shielded, such as the space vehicle, than the first shell. In this regard, the first shell 12 may be adjacent to the area 16 to be shielded and, in one embodiment, is attached or connected thereto, while the second shell 14 is spaced further from the area to be protected. As such, the radiation shield device 10 may include a truss network 18 between the first and second shells 12, 14 for connecting the second shell to the first shell and positioning the second shell relative to the first shell. In one embodiment, the truss network 18 is formed of a plurality of truss members extending between and connected to the first and second shells 12, 14. Although the truss network 18 may be formed of various materials, the truss elements of one embodiment may be formed of a composite material, such as a carbon reinforced matrix material in order to provide sufficient strength while limiting the weight of the truss network.

The second shell 14 may be larger than the first shell 12 as a result of the second shell being spaced further from the area 16 to be shielded and having, for example, a larger effective radius from the central axis 20 of the area to be shielded. However, the second shell 14 of one embodiment has the same or a comparable shape to that of the first shell 12, as shown in FIG. 1.

The first shell 12 includes a plurality of conductive coils that encircle the area 16 to be shielded. With respect to the embodiment of FIG. 1, the circles that graphically represent the first shell 12 are intended to be generally representative of one or more of the coils that encircle the area 16 to be shielded. Likewise, the second shell 14 includes a plurality of conductive coils that encircle the area 16 to be shielded from radiation as well as encircling the first shell 12. Again, the circles that graphically represent the second shell 14 in FIG. 1 are intended to be generally representative of one or more of the coils that encircle the area 16 to be shielded. Indeed, in one embodiment, both the first and second shells 12, 14 may include a substantially greater number of coils than the number of circles shown in FIG. 1. The coils of the first and second shells 12, 14 may be circular in shape.

The coils of one embodiment are formed of superconductive material. For example, the coils may be formed of a niobium titanium (NbTi) copper matrix multifilament superconducting wire winding. However, other embodiments of the present disclosure may include coils formed of alternative superconductive materials. In order to have superconductive properties, the superconductive material must be maintained at a temperature below its critical superconducting temperature onset level and as close to absolute zero as practical, preferably 40 K or lower, more preferably less than 25 K and most preferably less than 10 K. As such, the radiation shield device 10 may include a thermal control system in thermal communication with the superconductive material of the coils to lower the temperature of the superconductive material to a desired temperature below its critical superconducting temperature onset level.

In operation, current is flowed through the coils of the first shell 12 in one direction, such as a counterclockwise direction when looking down on the area 16 to be shielded from above. Conversely, current is flowed through the coils of the second shell 14 in the opposite direction, such as in a clockwise direction when viewed down on the area 16 to be shielded from above. As a result of the current flow through the coils, a magnetic field is generated by each of the first and second shells 12, 14 which function as first and second solenoids, respectively. As a result of the current flowing through the first and second shells 12, 14 being in opposite directions, however, the north and south poles of the first shell are correspondingly oriented opposite the north and south poles of the second shell. With reference to the illustrated embodiment, for example, the north pole of the first shell 12 may be at the upper end of the area 16 to be shielded and the south pole of the first shell may be at the lower end of the area to be shielded, while the north pole of the second shell 14 may be at the lower end of the area to be shielded and the south pole of the second shell may be at the upper end of the area to be shielded.

In one embodiment, the coils of the first shell 12 are arranged in groupings with current being capable of being separately and independently flowed through each coil grouping. Likewise, the coils of the second shell 14 may be arranged in groupings with current being capable of being separately and independently flowed through each coil grouping. In this embodiment, each coil grouping of the first shell 12 may be paired with a corresponding coil grouping of the second shell 14. As a result of current flow through the coils, each coil grouping of the first shell of this embodiment may have north and south poles that are correspondingly oppositely positioned from the north and south poles of the corresponding paired coil grouping of the second shell. As shown in FIG. 1, the coil groupings of the first and second shells 12, 14 may be arranged in arranged in offset parallel annular rings along the central axis 20. Alternatively, the coil groupings of the first and second shells 12, 14 may be oriented in planes that are rotated with respect to one another relative to the central axis 20, either with or without an offset.

Representative magnetic flux lines generated by the first and second shells 12, 14 are shown in FIG. 1. As a result of the opposite direction of the current flow through the coils of the first and second shells 12, 14, the magnetic fields generated by the current flow through the coils of the first and second shells offset one another within the area 16 to be shielded such that little or no magnetic field is generated therewithin. Thus, the radiation shield device 10 need not include a magnetic shield device to protect the interior of the area to be shielded from the magnetic fields generated by the radiation shield device itself. Accordingly, the weight of a space vehicle or the like may be reduced relative to space vehicles that require such an internal magnetic shield device.

As noted above, the second shell 14 may be larger than the first shell 12 as a result of its position exterior or outward of the first shell and its larger radius relative to the central axis 20 of the area 16 to be shielded. As such, while the first and second shells 12, 14 may in some embodiments include the same number of coils, the second shell of one embodiment includes a greater number of coils than the first shell. However, the current that is flowed through the coils of the first and second shells 12, 14 may be controlled such that the magnetic field strength of the first shell is opposing in direction and nominally equal or at least within a predefined percentage, such as 10% or, more preferably, 5%, of the magnetic field strength of the second shell. As a result, the magnetic fields generated by the first and second shells 12, 14 generally offset one another within the area 16 to be shielded such that the resulting magnetic field strength within the area to be shielded is a relatively low value, such as 0.1 Tesla or less.

In the region between the first and second shells 12, 14, the magnetic fields generated by the current flowing in opposite directions through the coils are directed in the same direction and are additive, thereby resulting in a stronger magnetic field between the first and second shells than that generated by either the first or the second shell individually. Although the magnetic field strength may be tailored based upon the configuration of the first and second shells 12, 14 and the current that flows through the coils of the first and second shells, the radiation shield device 10 of one embodiment generates a magnetic field of about 3 Tesla between the first and second shells and a magnetic field of about 0.1 Tesla within the area to be shielded. Thus, the radiation shield device 10 of one embodiment is constructed such that the ratio of magnetic field strength between the first and second shells 12, 14 to the magnetic field strength within the area 16 to be shielded is at least 10:1, such as 30:1.

By way of illustration, the magnetic field strength provided by a radiation shield device 10 of one embodiment is illustrated in FIG. 2 as a function of distance from the central axis 20 of the area 16 to be protected. In the illustrated embodiment, the medial cylindrical portion of the first shell 12 is spaced about 1.5 meters from the central axis 20 of the area 16 to be protected and the medial cylindrical portion of the second shell 16 is spaced about 2.2 meters from the central axis of the area to be protected. The radiation shield device 10 of one embodiment therefore provides a magnetic field having a strength between about 2.8 Tesla and 3.2 Tesla between the first and second shells 12, 14, a magnetic field strength of less than 0.1 Tesla, such as about 0 Tesla within the area 16 to be protected and a similarly relatively limited magnetic field outside of the second shell. As a result of the relatively high magnetic strength between the first and second shells 12, 14, however, the radiation shield device 10 of this embodiment may provide sufficient protection from charged particles while avoiding the generation of any meaningful magnetic field within the area 16 to be shielded.

Although the radiation shield device 10 may be configured in various fashions, the radiation shield device of one embodiment includes a power source 22 as shown in FIG. 3. The power source 22 is in communication with the first and second shells 12, 14, such as the plurality of coils of the first and second shells such that actuation of the power source causes current to flow through the coils of the first and second shells in the desired directions. The radiation shield device 10 of one embodiment is an active device such that the power supply 22 may alternately cause current to flow through the coils of the first and second shells 12, 14 in order to generate a protective magnetic field or cease the current flow through the coils of the first and second shells in order to no longer generate the protective magnetic field. As such, the power supply 22 may be configured to be actuated in instances in which approaching particle radiation is detected such that current flow is initiated and the protective magnetic field is generated prior to the particle radiation impinging upon the area 16 to be protected, such as a space vehicle. Once the particle radiation has dissipated, however, the power source 22 may be deactuated, thereby conserving energy until the next time that a protective magnetic field is to be generated.

As noted above, the coils of the first and second shells 12, 14 may be formed of a superconductive material. As such, the radiation shield device 10 may include a thermal control system 24 as also shown in FIG. 3 in order to lower the temperature of the superconductive material to a temperature below its critical superconducting temperature onset level prior to or concurrent with the flow of current therethrough. The thermal control system 24 may be embodied in various manners, but in one embodiment, the coils are immersed in a coolant, such as liquid helium, liquid oxygen, liquid nitrogen or liquid hydrogen, that serves to cool the superconductive material that forms the coils. For example, the radiation shield device 10 may include conduits through which the coils extend. The thermal control system 24 of this embodiment may therefore controllably supply coolant to flow through the conduits so as to draw heat out of the superconductive material. The thermal control system 24 may be either an open loop system or a closed loop system, but, in either embodiment, the thermal control system is advantageously configured to lower the temperature of the superconductive material to below its critical superconducting temperature onset level and as close to absolute zero as practical, such as to 40 K or lower, more preferably to 25 K or lower and even more preferably to less than 10 K.

As noted above, the radiation shield device 10 of one embodiment is an active device such that the thermal control system 24 may alternately activate the cooling of the superconductive material of the coils of the first and second shells 12, 14, such as by flowing coolant through conduits through which the coils also extend, in order to support the generation of a protective magnetic field or deactivate the cooling of the superconductive material of the coils, such as in instances in which the protective magnetic field need not be generated. Like the power supply 22, the thermal control system 24 may be configured to be actuated in instances in which approaching particle radiation is detected such that coils are cooled so as to support the flow of current therethrough and the generation of the protective magnetic field prior to the particle radiation impinging upon the area 16 to be protected, such as a space vehicle. Once the particle radiation has dissipated, however, the thermal control system 24 may be deactuated, thereby conserving the use of cryogenic fluids until the next time that a protective magnetic field is to be generated.

A radiation shield device 30 of another embodiment is shown in FIG. 4. In this embodiment, the radiation shield device 30 does not include first and second shells. Instead, the radiation shield device 30 includes two or more cylindrical coils 32 extending about and encircling the center cylindrical portion of an area 34 to be shielded, such as a space vehicle, and a pair of trapezoidal coils 36 extending about and encircling portions of the opposed trapezoidal end portions of the area to be shielded. Each of the coils may include a plurality of coils formed of a superconductive material. In operation, current may be caused to flow and through the coils in the same direction and a magnetic field may be generated as shown by the magnetic flux lines of FIG. 4. The magnetic field generated by the radiation shield device 30 of this embodiment also protects against particle radiation. However, the magnetic field generated by the radiation shield device 30 of this embodiment extends through and creates a magnetic field within the area 34 to be shielded, such as within the space vehicle.

As shown in cross-section in FIG. 5, a thermal control system of one embodiment may include a conduit 38 within which the windings that comprise a respective one of the coils are disposed. It is noted that the conduit 38 is not drawn to scale in FIG. 5, but is, instead, enlarged for purposes of illustration. In order to lower the temperature of the superconductive material that forms the windings to below the critical superconducting temperature onset level, the conduit 38 may be filled with a coolant, such as liquid helium. As illustrated in the embodiment of FIG. 5, the conduit 38 may be disposed within an outer conduit 40 that, in turn, is filled with a coolant, such as liquid hydrogen. The conduits may include other liquid coolants, or a series of liquid coolants, such as initially liquid nitrogen followed by liquid hydrogen, may be employed in order to efficiently lower and then maintain the temperature of the superconductive material. Additionally, while the thermal control system of the illustrated embodiment includes two concentric conduits 38, 40, other embodiments may include additional concentric conduits if so desired. The conduits 38, 40 may, in turn, be surrounded by thermal insulation 42, such as a layered composite insulation with paper. As such, the superconductive material may be lowered to a temperature below its critical superconducting temperature onset level so as to function in a superconductive manner. While one example of a thermal control system is depicted in FIG. 5, further details of a thermal control system are provided by U.S. patent application Ser. No. 12/966,350 entitled "Cryogenically Cooled Radiation Shield Device and Associated Method", filed concurrently herewith, the entire contents of which are incorporated by reference herein.

Referring now to FIG. 6, a method of shielding an area 16 from radiation includes providing the first and second shells 12, 14, each of which has a plurality of coils at least partially surrounding the area to be shielded from radiation with the second shell being spaced further away from the area to be shielded in the first shell. See operation 50. Current flow is then provided through the plurality of coils of the first shell 12 and concurrently through the plurality of coils of the second shell 14. See operation 52. In this regard, the current flow through the plurality of coils of the first shell 12 is in the opposite direction to that in which the current flows through the plurality of coils of the second shell 14. As such, the first shell 12 has north and south poles that are correspondingly oppositely positioned from the north and south poles of the second shell 14. Indeed, the current flow may be provided through the coils of the first and second shells 12, 14 such that the first and second shells have ampere-turns that result in nominally equal but opposing magnetic field strengths.

Since the coils of the first and second shells 12, 14 are formed of a superconductive material, the method may also control the temperature of the superconductive material, such as to a temperature below critical superconducting temperature onset level, while the current flows therethrough. See operation 54. Further, the method of shielding an area 16 from radiation in accordance of one embodiment may generate a magnetic field as a result of the current flow through the plurality of coils of the first and second shells 12, 14. See operation 56. In one embodiment, the ratio of the magnetic field strength between the first and second shells 12, 14 to the magnetic field strength within the area 16 to be shielded from radiation is at least 10:1, such as about 30:1. As such, the area 16, such as a space vehicle, may be shielded from radiation without generating a magnetic field or at least not any appreciable magnetic field within the area. Additionally, the method may shield an area 16 from radiation without adding substantial weight since, for example, the radiation shield device 10 need not include a magnetic shield device to protect the area to be shielded from the magnetic fields generated by the radiation shield device. Further, the method may shield an area 16 from radiation without requiring substantial energy for operation. In this regard, the method of shielding an area 16 from radiation may be activated in response to detection of approaching particle radiation, but may be deactuated, thereby conserving energy, in instances in which particle radiation is not imminent.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A radiation shield device comprising:
a first shell at least partially surrounding an area to be shielded from radiation, wherein the first shell comprises a plurality of coils that encircle the area to be shielded from radiation; and
a second shell at least partially surrounding the area to be shielded from radiation and spaced apart from and further away from the area to be shielded than the first shell, said second shell also comprising a plurality of coils that encircle the area to be shielded from radiation and the first shell,
wherein the coils of the first shell are arranged in coil groupings and paired with coil groupings of the second shell, and wherein the coil groupings of the first shell are configured to support current flow in an opposite direction to that in which the paired coil groupings of the second shell are configured to support current flow such that each coil grouping of the first shell has north and south poles that are correspondingly oppositely positioned from the north and south poles of the paired coil grouping of the second shell, and
wherein the first and second shells are configured with ampere-turns that result in opposing magnetic field strengths within the first shell that are within a predefined percentage of one another, and wherein the first and second shells are configured with ampere-turns that result in nominally equal magnetic field strengths.

2. A radiation shield device of claim 1 further comprising a truss network between the first and second shells for positioning the second shell relative to the first shell.

3. A radiation shield device of claim 1 wherein the plurality of coils of the first and second shells are configured such that a ratio of magnetic field strength between the first and second shells to magnetic field strength within the area to be shielded from radiation is at least 10:1.

4. A radiation shield device of claim 1 wherein the plurality of coils of the first and second shells are comprised of a superconductive material.

5. A radiation shield device of claim 4 further comprising a thermal control system configured to control a temperature of the superconductive material that comprises the plurality of coils of the first and second shells.

6. A radiation shield device of claim 1 wherein the first and second shells each have a medial cylindrical portion and opposed end portions that taper radially inward from the medial cylindrical portion.

7. A radiation shield device comprising:
a first shell at least partially surrounding an area to be shielded from radiation, wherein the first shell comprises a plurality of coils that encircle the area to be shielded from radiation; and
a second shell at least partially surrounding the area to be shielded from radiation and spaced apart from and further away from the area to be shielded than the first shell, said second shell also comprising a plurality of coils that encircle the area to be shielded from radiation and the first shell,
wherein the coils of the first and second shells are configured such that a ratio of magnetic field strength between the first and second shells to magnetic field strength within the area to be shielded from radiation is at least 10:1.

8. A radiation shield device of claim 7 further comprising a truss network between the first and second shells for positioning the second shell relative to the first shell.

9. A radiation shield device of claim 7 wherein the first and second shells are configured with ampere turns that result in nominally equal but opposing magnetic field strengths.

10. A radiation shield device of claim 7 wherein the coils of the first shell are arranged in coil groupings and paired with coil groupings of the second shell, and wherein the coil groupings of the first shell are configured to support current flow in an opposite direction to that in which the paired coil groupings of the second shell are configured to support current flow such that each coil grouping of the first shell has north and south poles that are correspondingly oppositely positioned from the north and south poles of the paired coil grouping of the second shell.

11. A radiation shield device of claim 7 wherein the plurality of coils of the first and second shells are comprised of a superconductive material.

12. A radiation shield device of claim 11 further comprising a thermal control system configured to control a temperature of the superconductive material that comprises the plurality of coils of the first and second shells.

13. A radiation shield device of claim 7 wherein the first and second shells each have a medial cylindrical portion and opposed end portions that taper radially inward from the medial cylindrical portion.

14. A method of shielding an area from radiation, the method comprising:
  providing current flow through a plurality of coils of a first shell that at least partially surrounds the area to be shielded from radiation; and
  providing current flow through a plurality of coils of a second shell that at least partially surrounds the area to be shielded from radiation and that is spaced apart from and further away from the area to be shielded than the first shell,
  wherein the coils of the first shell are arranged in coil groupings and are paired with coil groupings of the second shell, and wherein providing the current flow through the coil groupings of the first shell comprises providing the current flow in an opposite direction to that in which the current flows through the plurality of paired coil groupings of the second shell such that each coil grouping of the first shell has north and south poles that are correspondingly oppositely positioned from the north and south poles of the paired coil grouping of the second shell, and
  wherein the first and second shells are configured with ampere-turns such that current flow therethrough results in opposing magnetic field strengths within the first shell that are within a predefined percentage of one another, and wherein the first and second shells are configured with ampere-turns that result in nominally equal magnetic field strengths.

15. A method of claim 14 further comprising providing a truss network between the first and second shells for positioning the second shell relative to the first shell.

16. A method of claim 14 further comprising generating a magnetic field as a result of providing the current flow through the plurality of coils of the first and second shells such that a ratio of magnetic field strength between the first and second shells to magnetic field strength within the area to be shielded from radiation is at least 10:1.

17. A method of claim 14 wherein the plurality of coils of the first and second shells are comprised of a superconductive material, and wherein the method further comprises controlling a temperature of the superconductive material that comprises the plurality of coils of the first and second shells.

18. A method of claim 14 further comprising providing the first and second shells that each have a medial cylindrical portion and opposed end portions that taper radially inward from the medial cylindrical portion.

19. A radiation shield device of claim 1 wherein the second shell has a greater number of coils than the first shell.

20. A radiation shield device of claim 7 wherein the second shell has a greater number of coils than the first shell.

21. A method of claim 14 wherein the second shell has a greater number of coils than the first shell.

* * * * *